April 16, 1929.   E. PIRON ET AL   1,709,371
APPARATUS FOR DISTILLING SOLIDS
Filed Feb. 14, 1923   2 Sheets-Sheet 1

INVENTORS
Emil Piron
and
BY Virginius J. Caracristi
Gifford, Bull & Doull
ATTORNEYS Patented Apr. 16, 1929.

1,709,371

UNITED STATES PATENT OFFICE.

EMIL PIRON, OF NEW YORK, AND VIRGINIUS Z. CARACRISTI, OF BRONXVILLE, NEW YORK, ASSIGNORS TO PIRON COAL DISTILLATION SYSTEMS, INC., OF NEW YORK, N. Y., A CORPORATION OF DELAWARE.

APPARATUS FOR DISTILLING SOLIDS.

Application filed February 14, 1923. Serial No. 619,051.

The present invention relates to apparatus for the distillation of solid material, particularly of coal into coke.

Figure 1:
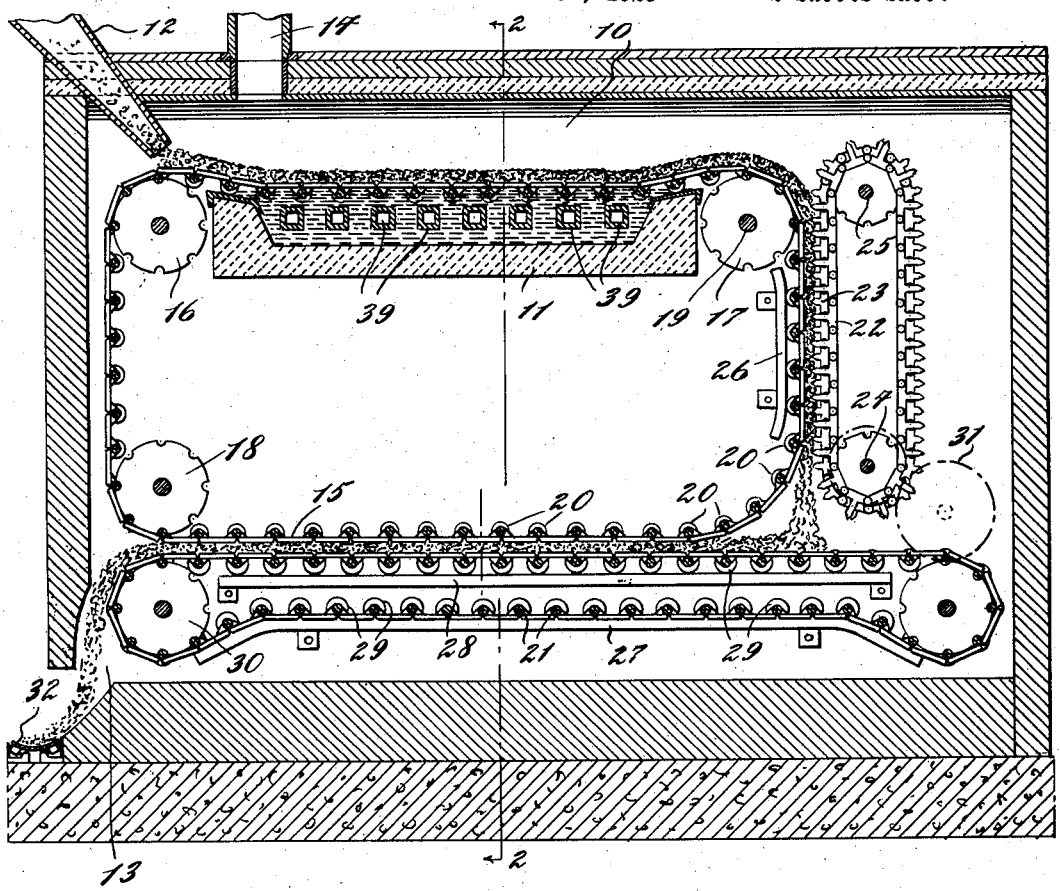
Figure 2:
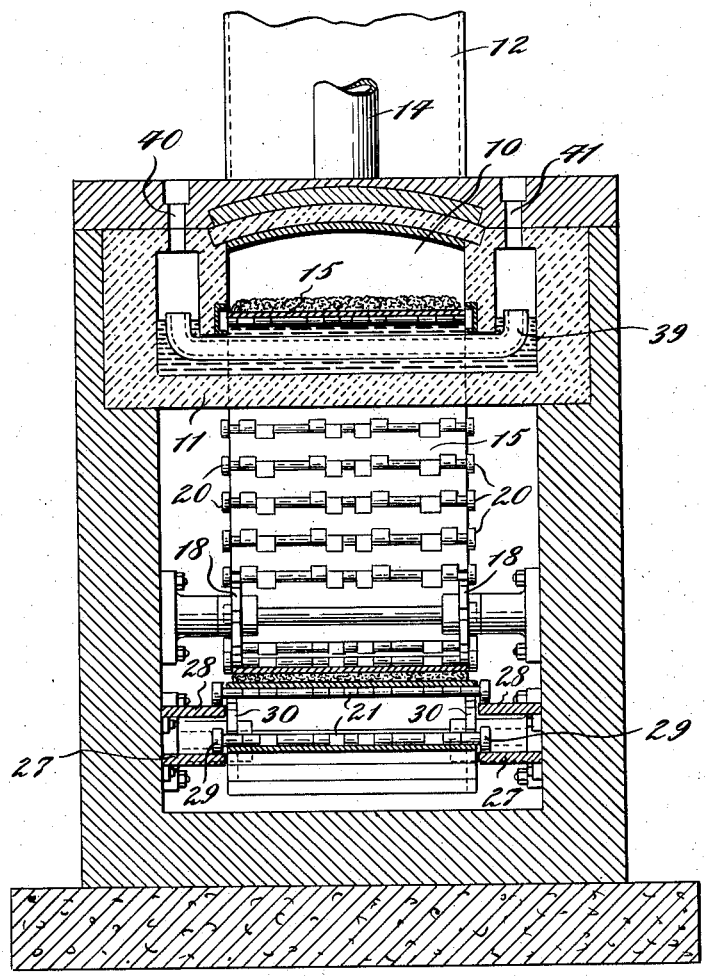

The invention will be best understood from the following description and the annexed drawings, in which Fig. 1 shows a vertical section of one embodiment of the invention and Fig. 2 a section on the line 2—2 of Fig. 1.

In the arrangement illustrated, 10 is a chamber having a bath 11 extending across it, such bath being preferably of some suitable molten material, such as lead, though any other easily fusible material may be used, provided it does not volatilize at the distillation temperature of the material to be distilled and conducts heat readily.

At one end of the chamber is a feed hopper or chute 12 by which the material to be distilled, such as coal or the like, may be fed into the distillation chamber 10. A discharge chute 13 at the lower left-hand portion of the figure provides an outlet for the residue of distillation, and similarly a gas outlet 14 provides an outlet for the gases resulting from the distillation. Passing over the surface of the bath 11 and then around and beneath the same is an endless flexible conveyor 15 made up preferably of a series of plates connected together to form a chain in any of the well-known manners. The chain passes over sprockets 16, 17 and 18, and preferably the sprocket 17 will be a driving sprocket, its shaft 19 being driven from any suitable source of power, not shown. The sprockets 16 and 17 are arranged relative to the bath 11, preferably so that the chain 15 will float across the surface of the bath, if the material of the bath has a greater specific gravity than the gravity of the conveyor 15, which will ordinarily be made up of iron or steel links. For a purpose to be described hereinafter, the conveyor 15 may be provided with rollers 20 on the outer ends of the connecting pins in the well-known manner, and, if desired, these rollers may be used to support the conveyor as it passes across but closely adjacent the surface of the bath.

The material to be distilled, as for instance, coal, passes through the chute 12 and onto the conveyor 15 in a relatively thin layer and is then carried by the conveyor across the surface of the bath 11, during which time, the distillation process is carried out and the gases driven off pass out of the gas outlet 14. If the conveyor is permitted to cool on its return run to receive an additional supply of coal from the inlet 12, it is obvious that there would be considerable heat loss and also some delay in beginning the distillation process while the conveyor 15 is being re-heated by the bath. To avoid both of these difficulties, a second flexible conveyor 21 is provided having a portion traveling beneath a part of the return run of the conveyor 15 and arranged to receive the residue of distillation, such as coke, from the conveyor 15 and to carry it to the outlet 13. The conveyor 15 is preferably arranged so that it will rest on the residue on the conveyor 21. To accomplish this, a sprocket is omitted at the lower right-hand portion of the return run of the chain, so that the chain is free to rest by its own weight on the residue.

By the arrangement described, the residue is maintained at a relatively high temperature for a longer time than it would otherwise be if it passed out of the distillation chamber as soon as it had passed across the surface of the bath, so that any volatile material which requires considerable time for distillation will be distilled. Furthermore, the conveyor 15 does not cool to the extent that it otherwise would.

When certain coals are distilled, the coke may become more or less caked and adhere to the conveyor 15, and preferably the residue will be broken away from the conveyor 15 and permitted to fall freely on the conveyor 21, so as to obviate any difficulty due to its adherence to the conveyor 15. Any suitable device may be used for this purpose. In the illustrative embodiment, a plurality of chains running at different speeds is shown for this purpose, such chains being shown at 22 and 23, all of these chains being carried on the shafts 24 and 25 by sprockets of different size, so that the speed of alternate chains may be different from the speed of the remainder of the chains. Each of the chains 22 and 23 may be provided with spikes or projections which will engage with the residue as it passes over the sprocket 17, and preferably the speeds of the chains 22 and 23 will each be different from that of the conveyor 15. Consequently, a differential motion will be set up between the conveyor 15 and the residue which may adhere thereto and the chains 22 and 23, which will effectually break up the residue and disengage it from the conveyor 15, so that it will fall freely to the surface of the conveyor 21. In order to hold the conveyor 15 so that the material thereon may be engaged by the projections on the chains 22 and 23, a guide piece 26 to be contacted by the rollers 20 may be provided. Similarly, guide pieces 27 and 28 may be provided for the rollers 29 of the conveyor 21.

This breaking up of the cakes of coke is advantageous because it makes the residue easier to handle and furthermore any gas contained in hardened bubbles in the caked coke will be freed before the coke is removed from the oven and will flow to the outlet 14, together with the main portion of the gases of distillation, since the coke is thus broken up while it is still in the distillation chamber.

The conveyor 21 will be driven from any suitable source of power, and preferably applied to the shaft of the sprocket 30 and, by means of an intermediate gear 31, this same motion may drive the chains 22 and 23.

As the residue passes out of the outlet 13, it preferably is delivered to a continuous conveyor, such as the belt conveyor 32 illustrated.

It will be noted that in the arrangement illustrated, the chamber 10 is entirely closed, except for the fuel inlet and outlet for the residue, as well as for the usual gas outlet, and that the fuel inlet and the outlet 13 are both on the same side of the apparatus.

The bath 11 may be kept heated by any suitable heating apparatus, such as the tubes 39 extending beneath the surface of the bath. These tubes are supplied with inflammable gases supplied through inlets 40, the gases of combustion passing out of the outlet 41. Since the particular method of heating the bath 11 is no part of the present invention, further description is unnecessary.

It will be understood that the embodiment of the invention may be widely varied and the arrangement shown in the drawings is merely illustrative.

We claim:

1. A distillation apparatus for solid materials comprising a distillation chamber, a first endless conveyor having one portion of its run passing through said chamber, means to feed the material to be distilled to said conveyor, a second endless conveyor having one of its runs parallel to a part of the return run of the first conveyor and adapted to receive the residue of distillation from the first conveyor and support and carry it in contact with a portion of the return run of the first conveyor, the return run of the first conveyor being abruptly changed in direction before and after it runs parallel to the second conveyor.

2. A distillation apparatus for solid materials comprising a distillation chamber, a first endless conveyor having one portion of its run passing through said chamber, means to feed the material to be distilled to said conveyor, means to free the residue of the distillation from the first conveyor, a second endless conveyor having one of its runs parallel to a part of the return run of the first conveyor and adapted to receive the residue of distillation from the first conveyor and support and carry it in contact with a portion of the return run of the first conveyor.

3. A distillation apparatus for solid materials comprising a distillation chamber, a first endless conveyor having one portion of its run passing through said chamber, means to feed the material to be distilled to said conveyor, a second endless conveyor having one of its runs parallel to a part of the return run of the first conveyor and adapted to receive the residue of distillation from the first conveyor and support and carry it in contact with a portion of the return run of the first conveyor, said return run being arranged to be supported by the residue of distillation on said second conveyor, the return run of the first conveyor being abruptly changed in direction before and after it runs parallel to the second conveyor.

4. A distillation apparatus for solid materials comprising a distillation chamber, a bath of heated molten material in said chamber, a first endless conveyor having a portion of its run passing closely adjacent the surface of the bath and its return run passing beneath the bath, means to supply material to be distilled to said first conveyor to be carried over the surface of the bath, a second endless conveyor having one of its runs parallel to the return run of the first conveyor and adapted to receive the residue of distillation from the first conveyor and carry it in contact with a portion of the return run of the first conveyor, the return run of the first conveyor being abruptly changed in direction before and after it runs parallel to the second conveyor.

5. A distillation apparatus for solid materials comprising a distillation chamber, a bath of heated molten material in said chamber, a first endless conveyor having a portion of its run passing closely adjacent the surface of the bath and its return run passing beneath the bath, means to supply material to be distilled to said first conveyor to be carried over the surface of the bath, a second endless conveyor having one of its runs parallel to the return run of the first conveyor and adapted to receive the residue of distillation from the first conveyor and carry it in contact with a portion of the return run of the first conveyor, said return run being arranged to be supported by the residue of distillation on said second conveyor, the return run of the first conveyor being abruptly changed in direction before and after it runs parallel to the second conveyor.

6. A distillation apparatus for solid materials comprising a distillation chamber, a bath of heated molten material in said chamber, a first endless conveyor having a portion of its run passing closely adjacent the surface of the bath and its return run passing beneath the bath, means to supply material to be distilled to said first conveyor to be carried over the surface of the bath, means to free the residue of distillation from the first conveyor, a second endless conveyor having one of its runs parallel to the return run of the first conveyor and adapted to receive the residue of distillation from the first conveyor and carry it in contact with a portion of the return run of the first conveyor.

7. A distillation apparatus for solid materials comprising a distillation chamber, a bath of heated molten material in said chamber, a first endless conveyor having a portion of its run passing closely adjacent the surface of the bath and its return run passing beneath the bath, means to supply material to be distilled to said first conveyor to be carried over the surface of the bath, means to free the residue of distillation from the first conveyor, a second endless conveyor having one of its runs parallel to the return run of the first conveyor and adapted to receive and carry it in contact with a portion of the return run of the first conveyor, said return run being arranged to be supported by the residue of distillation on said second conveyor.

8. A distillation apparatus for solid materials comprising a distillation chamber, an endless material supporting conveyor having an upper and a lower run with at least one of said runs passing through said chamber, means to supply heat only to said upper run as it is passing through said chamber, means to feed the material to be distilled to said upper run, and means to receive the residue of distillation from said upper run and maintain it in contact with the non-heated lower run of the conveyor during at least a portion of its return to the feeding point, the lower run of the first conveyor changing abruptly in direction before and after it runs parallel and adjacent said last named means.

9. A distillation apparatus for solid materials comprising a distillation chamber, a first endless material supporting conveyor having an upper and a lower run with both of said runs passing through said chamber, means to supply heat only to said upper run as it is passing through said chamber, means to feed the material to be distilled to said upper run, a second endless conveyor having one of its runs parallel to a part of said lower run of the first conveyor and adapted to receive the residue of distillation from the first conveyor and carry it closely adjacent a portion of the non-heated lower run of the first conveyor, the lower run of the first conveyor changing abruptly in direction before and after it runs parallel and adjacent said run of the second conveyor.

10. A distillation apparatus for solid materials comprising a distillation chamber, a first endless material supporting conveyor having an upper and a lower run with both of said runs passing through said chamber, means to supply heat only to said upper run as it is passing through said chamber, means to feed the material to be distilled to said upper run, means to free the residue from the first conveyor, a second endless conveyor having one of its runs parallel to a part of said lower run of the first conveyor and adapted to receive the residue of distillation from the first conveyor and carry it closely adjacent a portion of the non-heated lower run of the first conveyor, the lower run of the first conveyor changing abruptly in direction before and after it runs parallel and adjacent said run of the second conveyor.

EMIL PIRON.
VIRGINIUS Z. CARACRISTI.